United States Patent

Yamamoto et al.

[11] Patent Number: 5,540,751
[45] Date of Patent: Jul. 30, 1996

[54] METHOD FOR RECOVERING ZINC FROM ZINC CONTAINING DUST

[75] Inventors: Naoki Yamamoto; Katsuhiro Takemoto; Noboru Sakamoto; Yoshito Iwata, all of Kawasaki, Japan

[73] Assignee: NKK Corporation, Tokyo, Japan

[21] Appl. No.: 349,490

[22] Filed: Dec. 2, 1994

[30] Foreign Application Priority Data

Dec. 10, 1993 [JP] Japan .................................. 5-309972

[51] Int. Cl.$^6$ .................................................. C22B 19/04
[52] U.S. Cl. ................................ 75/376; 75/658; 75/961; 75/10.14
[58] Field of Search .................. 75/10.3, 10.31, 75/10.32, 658, 961, 376, 10.14

[56] References Cited

U.S. PATENT DOCUMENTS

| | | | |
|---|---|---|---|
| 2,127,632 | 8/1938 | Najarian | 75/324 |
| 3,770,416 | 11/1973 | Goksel . | |
| 4,612,041 | 9/1986 | Matsuoka et al. | 75/658 |
| 4,917,723 | 4/1990 | Coyne, Jr. . | |
| 4,940,487 | 7/1990 | Lugscheider et al. . | |
| 5,279,643 | 1/1994 | Kaneko et al. | 75/961 |
| 5,364,441 | 11/1994 | Worner | 75/961 |

FOREIGN PATENT DOCUMENTS

| | | |
|---|---|---|
| 0150805 | 8/1985 | European Pat. Off. . |
| 0551992 | 7/1993 | European Pat. Off. . |
| 1076156 | 2/1960 | Germany . |
| 1162389 | 2/1964 | Germany . |
| 58-144437 | 8/1983 | Japan . |

OTHER PUBLICATIONS

Patent Abstracts Of Japan, vol. 7, No. 263 (C–196), 24 Nov. 1983 of JP-A-58 144 437 (Sumitomo Kinzoku Kogyo), 27 Aug. 1983.
Patent Abstracts Of Japan, vol. 8, No. 222 (C–246) (1659), 9 Oct. 1984 of JP–A–59 107 036 (Shin Nippon Seitetsu), 21 Jun. 1984.

*Primary Examiner*—Melvyn Andrews
*Attorney, Agent, or Firm*—Frishauf, Holtz, Goodman, Langer & Chick, P.C.

[57] ABSTRACT

A method for recovering zinc from zinc comprising the steps of:

producing agglomerates containing carbon from dust which contains zinc in a form of zinc oxides;

charging the agglomerates into molten metal, the zinc oxides in the agglomerates being reduced and vaporized into a vaporized zinc; and collecting the vaporized zinc as zinc oxide with a generated dust.

22 Claims, 9 Drawing Sheets

CARBON CONTENT COATING LAYER (%)

TIME FROM CHARGING (min.)

METHOD FOR RECOVERING ZINC FROM ZINC CONTAINING DUST

BACKGROUND OF THE INVENTION

1. Field of Invention

The present invention relates to a method for recovering zinc from dust, and more particularly to a method for recovering zinc from dust containing iron as a main component.

2. Description of the Related Arts

Since a dust recovered in steel works has a high iron content, the dust is efficiently utilized as an iron source. However, some of the dust contains zinc. When such zinc containing dust is charged into a blast furnace, the normal operation of the blast furnace may be hindered. Accordingly, a dust containing zinc at an excessive amount can not be used as a raw material for the blast furnace.

For example, a blast furnace dust collected by a dust catcher of the blast furnace contains approximately 0.1 to 3 wt.% of zinc coming from iron ore, and a converter dust collected by a dust collector contains approximately 0.1 to 3 wt.% of zinc coming from galvanized steel sheets or the like which were charged to the converter as a scrap. When these dusts are charged to the blast furnace, the zinc components are reduced to metallic zinc, and the metallic zinc is melted to vaporize because it has a low boiling point. The melting point of metallic zinc is 420° C. and the boiling point is 920° C.

The vapor of metallic zinc ascends in the blast furnace along with the reducing gas, and it is cooled while ascending. A part of the metallic zinc vapor is discharged to outside of the blast furnace with the gas (reducing gas) of the blast furnace. However, the rest of the metallic zinc vapor adheres to the furnace wall surface in a form of liquid or solid before reaching the top of the furnace. If the metallic zinc adheres to the furnace wall surface and if it grows on the wall surface, then the gas permeability within the furnace is decreased and the operating condition of the furnace becomes abnormal. To prevent the furnace operation from such a bad state, currently the zinc content of the burden being charging into the blast furnace is controlled not to exceed 0.2 kg per ton of hot metal. Accordingly, the application of the dust containing zinc is performed after removing zinc.

A conventional method for removing zinc from a zinc containing dust and for recovering it is disclosed in unexamined Japanese patent publication No. 144437/1983. FIG. 3 illustrates the disclosed method. The reference number 40 denotes a hopper holding zinc containing dust, 44 denotes a mixer car holding a high temperature hot metal 62, and 48 denotes a wet separator having a water tank for dust collecting. The reference number 41 denotes an oxygen blowing pipe for transporting dust, 42 denotes a dust transfer pipe, 43 denotes a top blowen lance, 45 denotes a hood, 46 denotes a duct, and 47 denotes a fan.

The dust in the dust hopper 40 is transferred by oxygen blown through the oxygen blowing pipe 41, and is injected into the hot metal 62 in the mixer car via the top blowen lance 43. The blown dust is heated by the hot metal 62 and is reduced by carbon in the hot metal. The iron oxide in the dust melts into the hot metal, and the zinc oxide in the dust is vaporized and is sucked along with the powdered dust in the mixer car 44. The vaporized zinc is sent to the wet separator 48 and are then collected in water.

However, the above-described method has following problems. Since powdered dust is charged into the hot metal 62, bubbles generated in the hot metal contain dust. When the ascended bubbles break at the surface of the hot metal, the dust in the bubbles is carried over with the sucked flue gas or suspended at the surface of the hot metal. The suspended dust is difficult to melt into the hot metal, and a part of it is carried over. As a result, the wet separator 48 accepts the dust which has been blown into the hot metal and the dust is left in a state of being neither reduced nor vaporized. Consequently, the collected dust shows a very low zinc content and very high iron content, and the recovery efficiency of iron to hot metal becomes low.

Since the blown gas includes oxygen, fine particles of iron oxide which are newly generated by the blown oxygen are also carried over, and these particles are also collected by the wet separator 48. Accordingly, the zinc content in the collected dust is further lowered, and the zinc content may become lower than that in the supplied dust depending on the operating condition. Furthermore, the generation of the new fine particles of iron oxide degrades the recovery rate of iron into the hot metal.

When oxygen is included in the blown gas, the atmosphere in the container holding the hot metal likely becomes an oxidizing one. Therefore, the dust floating on the hot metal surface is difficult to be reduced. As a result, the quantity of zinc being vaporized is decreased, and the recovery rate of zinc is decreased. Also the iron oxide is likely discharged along with slag, and the iron recovery rate into the hot metal is lowered.

SUMMARY OF THE INVENTION

It is an object of the present invention to provide a method for recovering zinc from zinc containing dust wherein the zinc in the dust is efficiently reduced to vaporize and the zinc and iron in the dust are recovered at a high recovery rate.

To attain the above-mentioned object, the present invention provides a method for recovering zinc from zinc containing dust, comprising the steps of:

producing agglomerates containing carbon from dust which contains zinc in a form of zinc oxides;

charging the agglomerates into hot metal, the zinc oxides in the agglomerates being reduced and vaporized into a vaporized zinc; and collecting the vaporized zinc as zinc oxide with a generated dust.

DESCRIPTION OF EMBODIMENT

Figure 1:
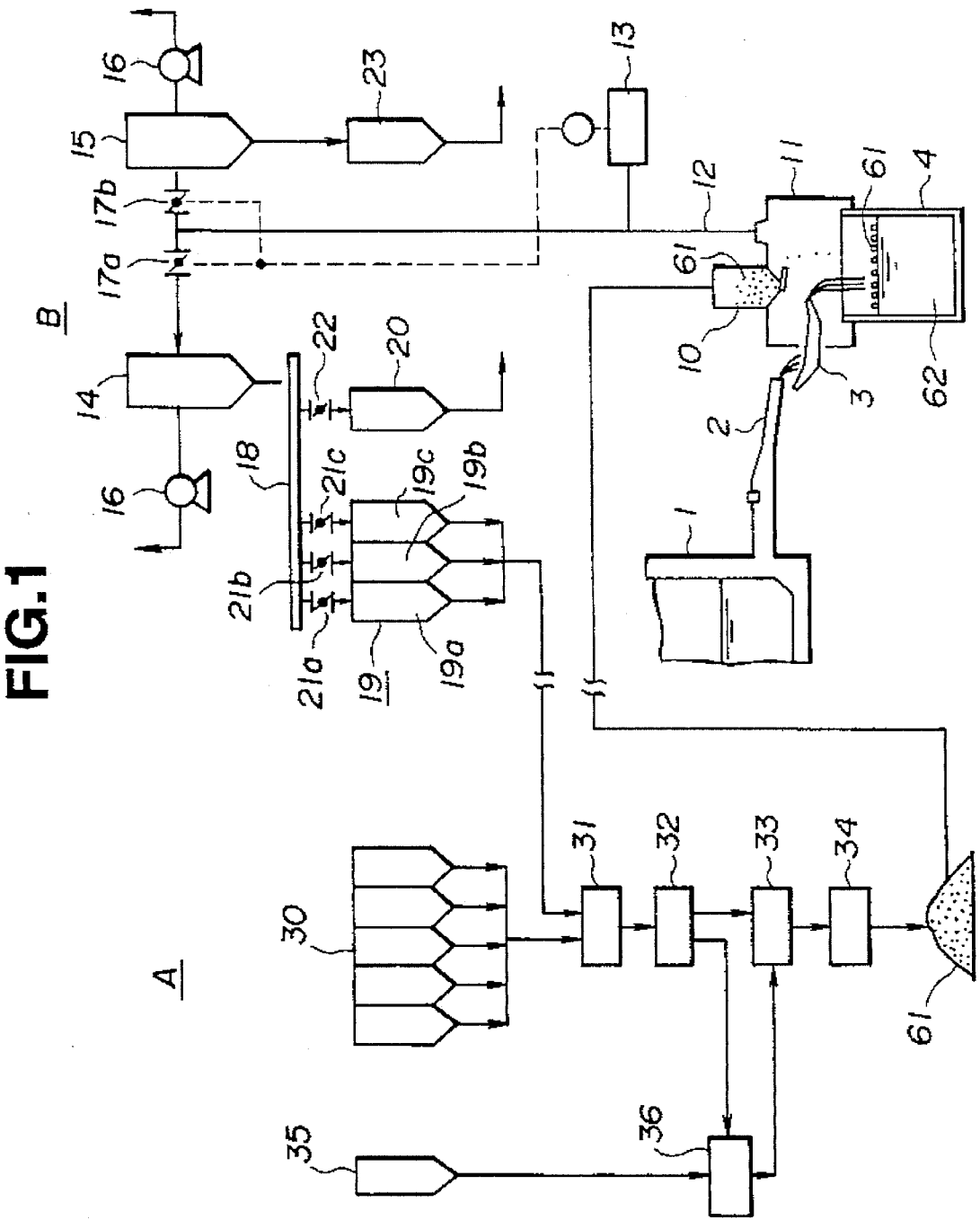
FIG. 1 is a schematic drawing which illustrates an example of the present invention.

In the present invention, agglomerates including carbon are produced from zinc containing dust. The agglomerates arc charged into a hot metal. After charging, the agglomerates are contacted with the hot metal. The agglomerates are heated up by the hot metal and the carbon in the agglomerates burns to make CO gas. The CO gas burns to become $CO_2$ gas on the surface of an agglomerate layer. This causes the agglomerates to be heated more and more. Zinc oxide in the agglomerates is reduced by the CO gas and vaporized. The vaporized zinc is changed to zinc oxide due to the contact with air. The generated zinc oxide dust is collected.

When the dust contains sufficient amount of carbon for use as carbon source, the agglomerates can be made from the zinc containing dust without addition of carbonaceous material. When the dust does not contain sufficient amount of carbon for use as carbon source, or when the dust does not contain sufficient carbon for securing desired amount of carbon, the zinc containing dust is agglomerated with a fine carbonaceous material, and the agglomerate is charged onto the hot metal.

According to the present invention, the zinc containing dust is agglomerated before charging it to the hot metal. Consequently, the phenomenon in which the charged dust is carried over an as-charged state hardly occurs, and dust which contains zinc at a high content is recovered. The recovery of iron into the hot metal is also improved.

Also according to the present invention, carbon is added to the agglomerate. The source of the carbon which is added to the agglomerate differs with the type of zinc containing dust to be treated. For example, when the zinc containing dust is a blast furnace dust containing a large amount or carbon, the required amount of carbon is supplied from the blast furnace dust, and no extra source of carbon is necessary to add. In another example, there may be a need for the addition of fine coke or pulverized coal to adjust the wanted level of carbon content. If the zinc containing dust is a converter dust which contains a very low concentration of carbon, the agglomeration is carried out by adjusting the carbon content of agglomerate by adding carbonaceous material such as fine coke and pulverized coal or blast furnace dust. The converter dust is generated in the steel making process.

Since the hot metal is at a high temperature, the presence of carbon in the agglomerate accelerates the reduction of agglomerate.

When the agglomerate is charged into the hot metal, the agglomerate floats ón the hot metal because specific gravity of the agglomerate is lower than that of hot metal. Then, the carbon in the agglomerate contacts air to burn, and generates carbon monoxide, which then brings the surrounding atmosphere of the agglomerate to the reducing atmosphere. Furthermore, the combustion of carbon occurs also in a micro-space inside of the grain of the agglomerate, so the combustion makes the inside space of grains a reducing atmosphere, also. The combustion of carbon heats the agglomerate, and temperature raise of the agglomerate swiftly occurs. In this manner, the carbon presence in the agglomerate brings the grains of agglomerate in a reducing atmosphere, and the temperature rising speed increases, so the reducing reaction of the zinc component and the iron component is significantly accelerated.

A preferable carbon content in the agglomerates is in a range of from 5 to 40%. When the carbon content becomes less than 5%, the recovery rate of zinc suddenly reduces. When the carbon content becomes to above 40%, the rate of zinc recovery saturates and unit consumption of the carbonaceous material to the recovered amount of zinc suddenly increases. A carbon content of 20 to 40% is more preferable. The carbon content can also be 10 to 30 wt.%.

When a carbonaceous material is included in a coating layer on the agglomerate, the combustion of the carbonaceous material promptly begins, which then accelerates the temperature increase of the agglomerate. Accordingly, the waiting time until the reducing reaction begins is shortened. In this case, a slight amount of coating of carbonaceous material induces the effect of shortening the waiting time. Even when the coating layer includes the carbon in an amount of 0.2% to the total amount of agglomerate, the shortening of the waiting time becomes significant. However, when the carbon in the coating layer exceeds 40% to the total amount of agglomerate, the rate of shortening the waiting time becomes less and the unit consumption of carbon material increases, so an excessive addition of carbon material is not preferable.

As described above, the inclusion of carbon material in the agglomerate accelerates the heating of the agglomerate. There is another means to accelerate the heating, in which a metallic iron having a high thermal conductivity is added to the zinc containing dust during agglomerating thereof. Mixed metallic iron in the agglomerate increases the speed of heating grains of agglomerate and shortens the waiting time until the reducing reaction begins. According to an experiment to determine the amount of the metallic iron necessary to rapidly heat the grains of the agglomerate into their inside portion, a preferred content of the metallic iron is in a range of from 1 to 90%. When the content of the metallic iron is less than 1%, the waiting time for starting the reducing reaction is extended and the necessary period for the reducing reaction is also extended. Therefore, the content of the metallic iron less than 1% is not favorable. Even when the content of the metallic iron exceeds 90%, the shortening rate of the waiting time becomes less, so the addition of the metallic iron exceeding 90% is not necessary. The metallic iron content of 50 to 75% is more preferable.

The metallic iron can be replaced by iron oxide, which gives a similar effect.

As described above, the invention prevents the carry-over of the zinc containing dust by agglomerating the powder zinc containing dust. However, if the strength of grains of the agglomerate is poor, the grains are broken when they are charged onto the hot metal owing to sudden vaporization of water in the agglomerate, and a part of these grains generate cracks and are powdered. The powdered agglomerates are carried over to degrade the zinc content in the recovered dust and to degrade the melting of dust into the hot metal bath, which then degrades the iron recovery to the hot metal.

Responding to the phenomenon, this invention increases the strength of the grains of the agglomerate by agglomerating the zinc containing dust with the addition of binder such as cement to a degree of 1 to 20%, and preferably 5 to 15 wt.%, as needed. If about 1% of the binder is added, the carry-over of the agglomerate caused by breaking and powdering is suppressed, and the zinc content in the recovered dust increases. However, the addition of the binder at above 20% induces mutual, strong, and dense binding of fine grains of dust which from the agglomerate, and forms a state where the internal space within the grains is closed. Consequently, the gas permeation through the internal space of the grain of the agglomerate becomes difficult, and the necessary period for reducing reaction extended. As a result, the specified reaction time passes without completing the reaction, and the amount of discharge of unreacted agglomerate increases, and the recovery rate of zinc and iron decreases.

A preferred agglomerate has a size distribution containing 10% or less for 1 mm or less of size and 20% or less for 40 mm or more of size. The lower limit of the size distribution (less than 10% for 1 mm or less of size) is determined to prevent carry-over of charged agglomerate. If the content of grains of 1 mm or less exceeds the lower limit, the rate of carry-over of the charged agglomerate rapidly increases. If the size distribution exceeds the upper limit (20% or less for 40 mm or above) and if the portion _ of coarse grains increases, then the heating time necessary to raise the temperature of the agglomerate charged onto the hot metal extends, and the rate of reducing reaction decreases. As a result, the zinc recovery rate rapidly decreases.

Carry-over of zinc by vaporization begins after charging the agglomerate into the hot metal, and after a certain time for zinc to be heated, reduced, and melted has passed, then by vaporization, and ends at the completion of the reducing reaction. After starting the reaction, the quantity of vaporized zinc suddenly increases at a certain point, and it rapidly decreases when the reaction approaches its end point. Consequently, if the dust collection is conducted for recovering zinc during a period for vaporizing a large amount of zinc, the dust containing large amount of zinc is recovered. In this respect, a continuous analysis of the zinc content in a generated dust along with the flue gas identifies an inflection point where the zinc content shows a sudden increase and decrease. Accordingly, if the desired value of the zinc content is set in advance, if the dust collection is conducted to recover zinc when the zinc content exceeds the set value, and if the dust collection is completed to recover zinc when the zinc content becomes below the set value to perform-the classified collection, then only dust containing a high concentration of zinc is recovered at a high efficiency.

EXAMPLE

FIG. 1 illustrates an example of the present invention. The reference symbol A denotes the process for agglomerating zinc containing dust. The reference symbol B denotes the process for recovering zinc.

In the agglomeration process A, the reference number 30 denotes the raw material hoppers which separately hold the blast furnace dust and the converter dust which are the recovered materials containing zinc, and each raw material is for agglomeration. The reference number 31 denotes the mixer, 33 denotes the curing equipment, and 34 denotes the drier. The reference number 35 denotes the carbonaceous material hopper for coating, and 36 denotes the pelletizer for coating. The reference number 61 denotes the agglomerate of such as the blast furnace dust and the converter dust which are the recovered materials containing zinc.

In the zinc recovery process B, the reference number 1 denotes the blast furnace, 2 denotes the runner, 3 denotes the tilting runner, 4 denotes the hot metal ladle receiving hot metal 62. The reference number 10 denotes the agglomerate charge hopper. The reference number 11 denotes the dust collection hood, 12 denotes the flue gas duct, 13 denotes the continuous analyzer, 14 denotes the dust collector for zinc recovery, 15 denotes the general use dust collector, 16 denotes the blower, 17a and 17b denote the flue gas switching dampers. The reference number 18 denotes the conveyer, 19a, 19b and 19c denote the recovered dust hoppers for recycling dust, 20 denotes the recovered dust hopper, 21a, 21b, 21c, denote the recovered dust hopper switching dampers for discharging dust, and 22 denotes recovered dust switching dampers, and 23 denotes the general use dust hopper.

The agglomerate is prepared in the following procedure. The procedure is described in accordance with the agglomerating process A. The dust containing zinc, such as blast furnace dust and converter dust and the carbonaceous materials such as fine coke and pulverized coal, which are held in the raw material hoppers 30, are discharged at a specified flow rate and are introduced to the mixer 31. A binder such as cement, quick lime, and bentonite, and a heat transfer assistant such as converter coarse dust are charged to the mixer 31 at the same time, at need. The mixture of dust and other components is fed to an agglomerating equipment 32 such as a pan type pelletizer and a briquetting machine. In the agglomerating equipment 32, the mixture is granulated to an adequate size. The granulated product is sieved to have a specified size distribution.

The sized granules are cured in the curing equipment 33 which are held in a steam atmosphere at 120° C. or more, then are dried in the drier 30 at 150° C. or more to become the agglomerate 61. Before the sized granules are cured and dried, they are coated with carbonaceous material, at need. In that case, the granules arc fed to the pelletizer 36 for coating such as a pan pelletizer or a drum pelletizer, and the fine coke is taken out from the carbonaceous material hopper for coating and is charged to the pelletizer 36 for coating. A specified amount of water is further added to the pelletizer 36 for coating 36, then the surface of the agglomerate is coated with fine coke.

The zinc recovery from the agglomerate is carried out in the following procedure. The procedure is described in accordance with the agglomerating process B. A specified amount of the agglomerate 61 is charged from the agglomerate charge hopper 10 onto the hot metal 62 received by the hot metal ladle 4. Since the specific gravity of the agglomerate 61 is less than that of the hot metal, the agglomerate floats on the surface of pig iron. The agglomerate is heated by the hot metal having a temperature of about 1500° C., and the carbon in the agglomerate burns. Then, the zinc oxide and iron oxide in the agglomerate are reduced by carbon monoxide generated by the combustion, and they become to metallic zinc and metallic iron. The metallic zinc generated by the reducing reaction is melted and is vaporized, and is converted to zinc oxide by contact with air and the zinc oxide exists in the generated dust. The generated dust containing zinc oxide is drawn with suction along with the flue gas, which flue gas is then passes through the flue gas duct 12 and enters the dust collector to be collected.

On the other hand, the metallic iron reduces its melting point while absorbing carbon, and it melts down at 1150° C. to be recovered in hot metal.

Regarding the collection of the generated dust, the continuous analyzer 13 determines continuously the zinc content of the generated dust contained in the flue gas flowing through the flue gas duct 12. If the zinc content is in the above specified value, the flue gas switching damper 17a opens, and the dust is collected at the dust collector for zinc recovery 14. If the zinc content is below the specified value, the flue gas switching damper 17b opens, and the dust is collected at the general use dust collector 15, which collected dust is sent to the sintering plant as a raw material for sintering.

Figure 2:
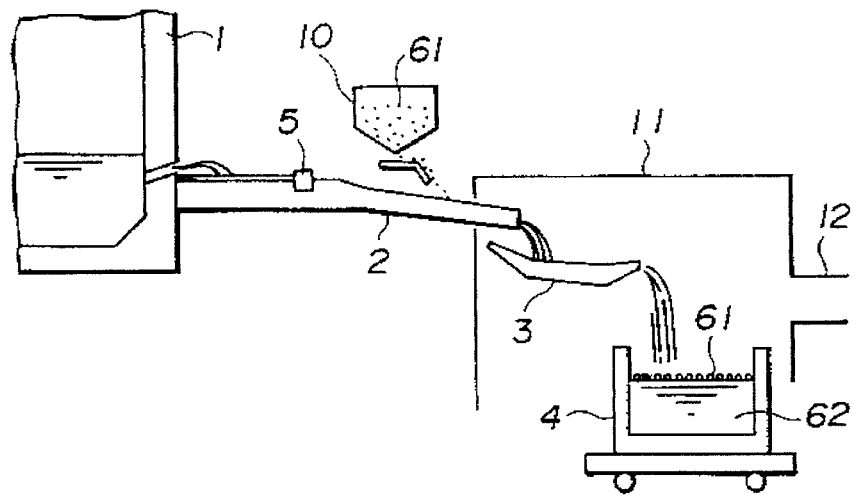
FIG. 2 is an elevational view, partly in cross-section which illustrates another example of the present invention.
Figure 3:
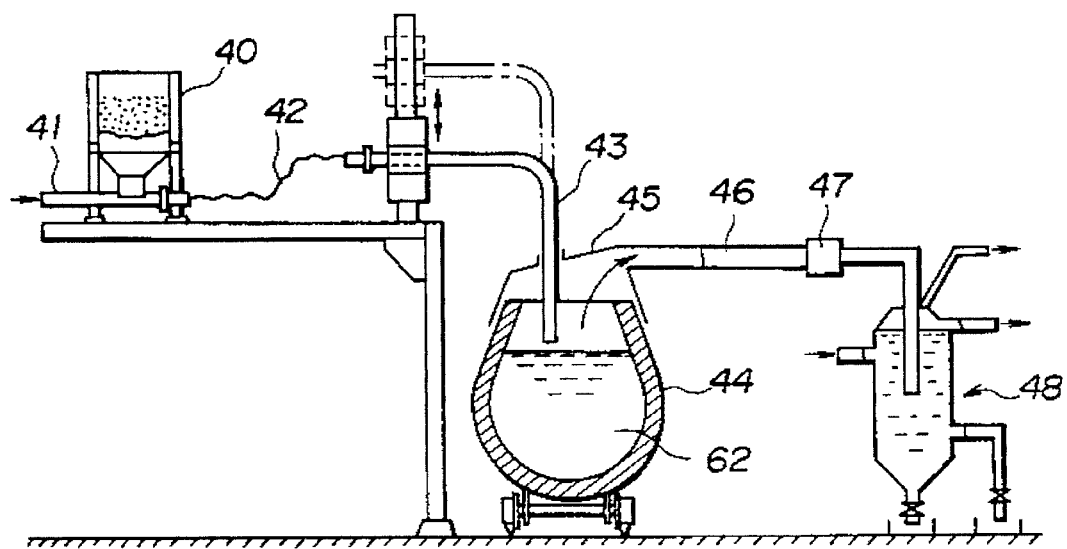
FIG. 3 is an elevational view, partly in cross-section which illustrates a conventional method for recovering zinc from dust.

The dust collected at the dust collector for zinc recovery 14 is transferred by the conveyer 18 and is stored in the recovered dust hoppers. Since the dust collected in the dust collector for zinc recovery 14 contains iron oxide, the zinc content is low, and the level of zinc content is insufficient for effective use of the dust as a zinc source without processing. Accordingly, the collected dust is again agglomerated, vaporized, and recycled to raise the zinc content of the generated dust. For example, in the case that the dust generated at the first vaporization of the agglomerate prepared from the blast furnace dust and the converter dust is collected, the recovered dust switching damper 21a opens, and the dust transferred by the conveyer 18 is stored in the recovered dust hopper for recycling dust 19a. The dust is then fed to the mixer 31 of the agglomerating process A, where the dust is again agglomerated. The dust generated at the vaporization of the secondary agglomerated product is stored in the recovered dust hopper for recycling dust 19b. After repeating these recycling treatments, the zinc content of the dust attain a specified level. Then, the collected dust is stored in the recovered dust hopper for discharging dust 20, and it is supplied as the zinc source, FIG. 2 illustrates another example of the present invention. The reference numbers in FIG. 2 corresponding to the same components with FIG. 1 have the same numbers one another, and the description is not given here. According to the example, the agglomerate 61 is charged onto the hot metal flow after eliminating the slag by the skimmer 5 discharged from the blast furnace, or onto the hot metal flowing through the runner 2 at an elevated temperature. The agglomerate charged into the hot metal ladle 4 floats on the hot metal owing to the difference of specific gravity.

Then, the reaction which occurs is similar to the reaction which occurs when the agglomerate is charged onto the hot metal which was filled in the hot metal ladle 4 in advance. In this manner, when the agglomerate 61 is charged onto the hot metal flow at an elevated temperature before being charged into the hot metal 4, the agglomerate 61 is heated before it reaches the hot metal ladle 4, and the heating period of the agglomerate within the hot metal ladle 4 is shortened. As a result, the vaporization of zinc swiftly begins.

The following are the test results. Table 1 lists the weight percentage of the dust raw material components which structure the raw materials of agglomerate.

TABLE 1

| Items | Total Fe | Metallic Fe | Zn | C | $SiO_2$ | CaO |
|---|---|---|---|---|---|---|
| Blast furnace Dust | 35 | 1 | 1.94 | 32.3 | 6.4 | 3.2 |
| Converter Dust | 67 | 15 | 2.34 | 1.7 | 1.5 | 2.2 |
| Converter Coarse Dust | 85 | 72 | 0.03 | 0.8 | 1.2 | 4.0 |

EXAMPLE-1

Figure 4:
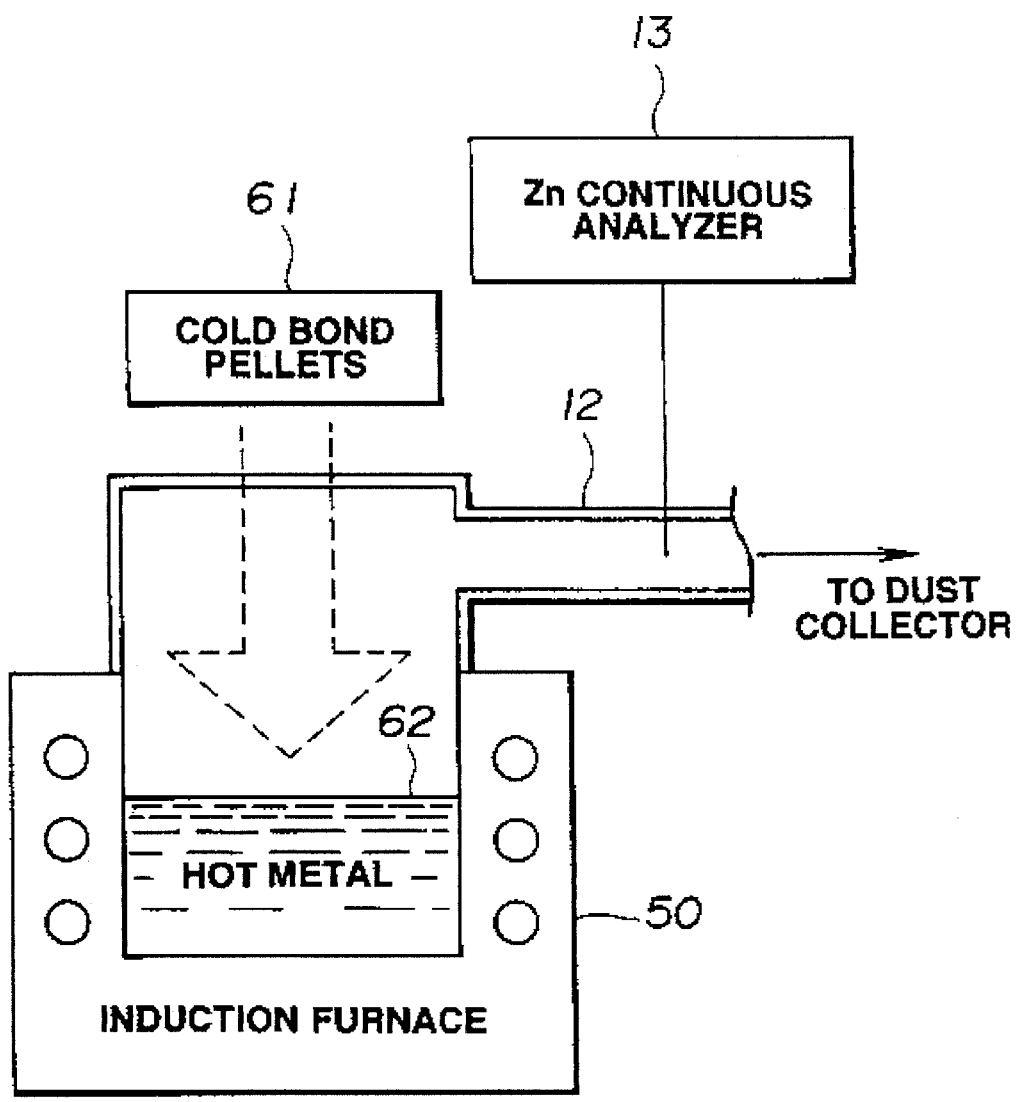
FIG. 4 is a schematic diagram which illustrates an apparatus for bench scale test of the present invention.

A test was conducted using a test apparatus illustrated in FIG. 4. The reference number 50 denotes the induction furnace, 11 denotes the dust collection hood, 12 denotes the flue gas duct, 13 denotes the continuous analyzer, 61 denotes the agglomerate, and 62 denotes the hot metal.

The blast furnace dust (zinc content of 2.34%) shown in Table 1 was mixed with Portland cement and fine coke to agglomerate to obtain what is called the cold bond pellets (agglomerate). The mixed amount of the cement and the fine coke was 10% for each of them to the total amount of mixture. The obtained pellets were sieved to size ranging from 3 to 10 mm.

The prepared pellets were charged onto the hot metal which was maintained at a temperature of 1500° C. at a rate of 20 kg/t-hot metal. The state of reduction and melting of the pellets was observed.

A continuous analyzer was used to measure the zinc content in the generated dust included in the flue gas sampled by suction to determine the change of vaporized amount of zinc with time. Also the mass analysis of zinc component was carried out by sampling specimens from dust in flue gas, the hot metal after the completed reaction, and the slag. From these obtained data, the mass balance of zinc before and after the charge of pellets was prepared.

Figure 5:
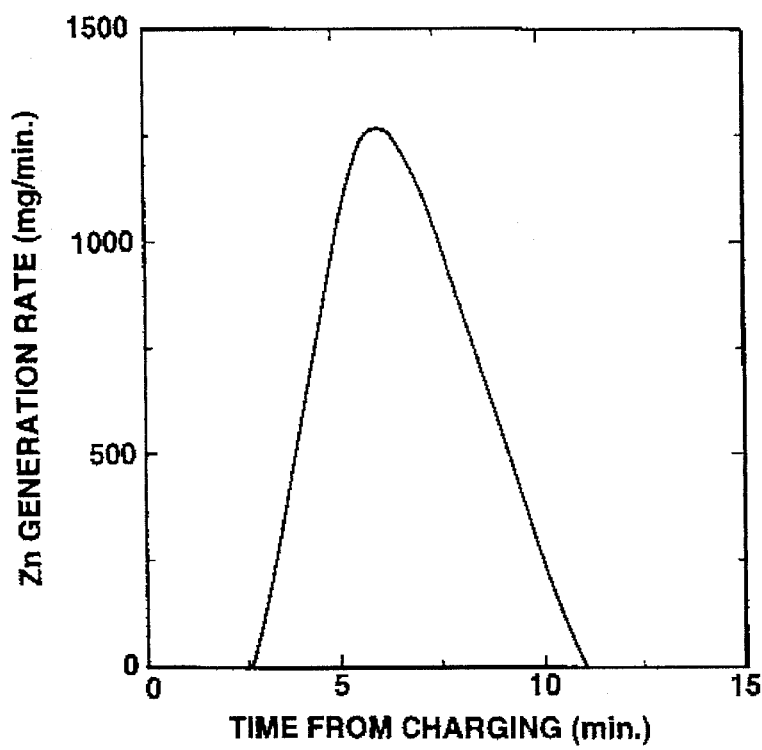
FIG. 5 in a graph which shows the change of zinc vaporization rate with time after charging the pellets according to the present invention.

FIG. 5 shows the change of amount of zinc vaporized after the charge of pellets with time. At about 3 min. after charging the pellets, the reduction and vaporization of zinc began. The rate of vaporization reached the maximum at about 7 min. Then, the vaporization was completed at about 12 min.

Figure 6:
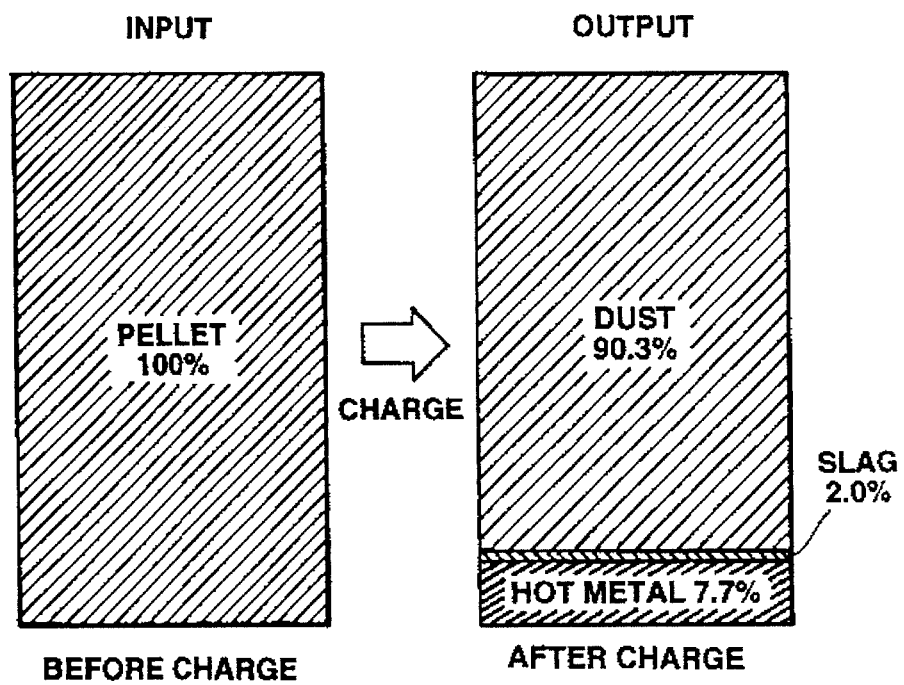
FIG. 6 is a schematic diagram which shows a mass balance of zinc before and after charging pellets according to the present invention.

FIG. 6 shows a mass balance of zinc before and after the charge of pellets. About 90% of zinc in the charged pellets was found in the generated dust, about 8% was found in the hot metal, and about was found in the slag. Consequently, the zinc recovery rate of the charged pellets was 90%, and the iron recovery rate was 90%.

COMPARATIVE EXAMPLE-1

Converter dust having the composition as in Example 1 was charged in a form of powder without agglomeration. The apparatus that was used was the same as in Example 1. The zinc recovery rate of the charged converter dust was 70%. The iron recovery rate was 20%, which was far below that in Example 1. Furthermore, 50% of the charged converter dust was carried over into the generated dust, so the zinc content in the generated dust was as low as 0.55%.

EXAMPLE-2

Agglomerates having various grain sizes, which were prepared by the compositions listed in Table 2 were tested by charging such agglomerates onto the hot metal flow at the exit of a skimmer of a 4000 m³ blast furnace during discharging, separately. The temperature of the hot metal at the charging point was about 1500° C., and the charge rate of the agglomerate was 20 kg per ton of hot metal. The test results were summarized in Table 2.

As seen in Table 2, when the size of the charged agglomerate was 100% for 1 mm of less, (the test level A1), the zinc content in the generated dust was less than 1%, though the zinc recovery rate was extremely high. The low zinc content was caused by carrying over a large amount of charged material and by mixing the charged material which was not reduced nor vaporized into the generated dust. When an agglomerate having a size of 40 mm or more was included at 25% or more, (test level A5), the zinc recovery rate rapidly decreases. Consequently, it was found that a preferable size distribution of the agglomerate was about 10% for 1 mm or less, and about 20% or less for 40 mm or more.

EXAMPLE-4

An intermediate agglomerate was prepared with the composition given in Table 4. Then the intermediate agglomerate was coated by fine coke at different amounts, separately. In that case, the total amount of the fine coke within the grains or the agglomerate and the fine coke coated on the grains was kept at 40% to the total amount of the agglomerate. These agglomerates were tested by charging onto the hot metal flow at the exit of a skimmer. The results are summarized in FIG. 8.

Figure 8:
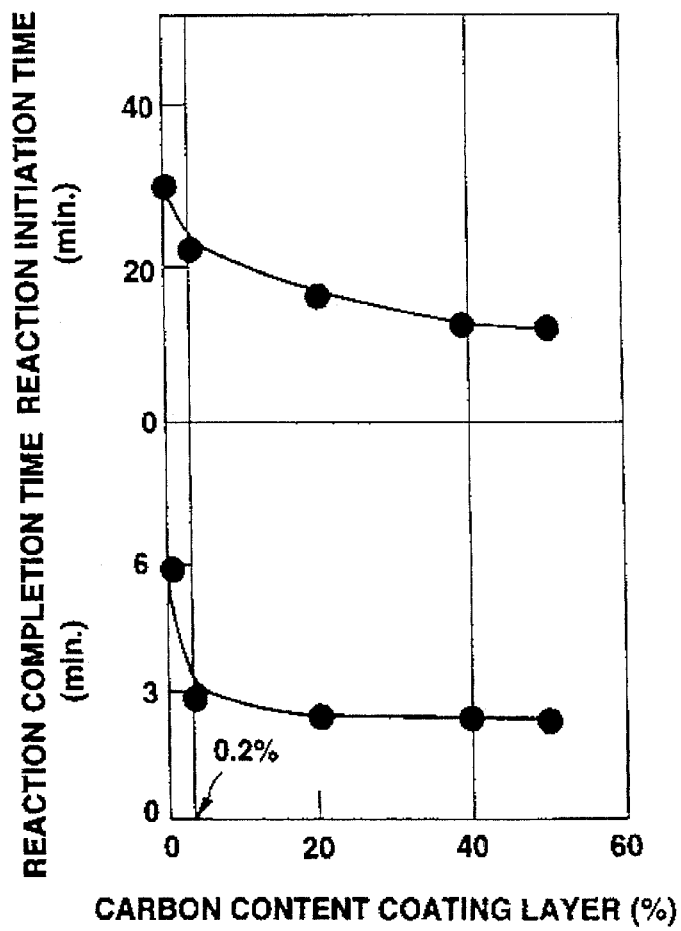
FIG. 8 are graphs which show the relation among carbon content in coating, reaction initiation time, and reaction completion time.

FIG. 8 shows the relation between the content of coated carbon, the reaction initiation time (waiting time for beginning the reducing reaction), and the reaction completion time. As seen in the figure, a coating of fine coke as small as 0.2% of carbon equivalent amount shortened the reaction initiation time to about half that of a non-coated agglomerate, (from about 6 min. to 3 min.), and the reaction comple-

TABLE 2

| Test Level | Agglomerate Size (%) | | Results (%) | | | Blending Ratio of Raw Material | | | | Agglomerate Shape |
|---|---|---|---|---|---|---|---|---|---|---|
| | 1 mm or less | 4 mm or more | Zn Recovery Rate | Fe Recovery Rate | Zn Content in Dust | Blast Furnace Dust | Fine Coke | Pulverized Coal | Cement | |
| A 1 | 100 | 0 | 95 | 10 | 0.95 | 100 | 15 | — | 10 | Pellet |
| A 2 | 10 | 0 | 90 | 60 | 18.32 | 100 | 15 | — | 10 | Pellet |
| A 3 | 5 | 10 | 88 | 60 | 20.25 | 100 | — | 15 | 10 | Pellet |
| A 4 | 1 | 20 | 86 | 50 | 25.28 | 100 | 15 | — | 10 | Pellet |
| A 5 | 0 | 25 | 60 | 30 | 30.32 | 100 | 15 | — | 10 | Pellet |
| B 1 | 5 | 10 | 89 | 62 | 19.48 | 100 | 15 | — | 10 | Briquette |

EXAMPLE-3

As shown in Table 3, agglomerates with various levels of carbon content were prepared by mixing fine coke for adjusting the carbon content to a converter dust and by mixing fine ore for adjusting the carbon content to a blast furnace dust. These agglomerates were tested by charging such agglomerate as onto the hot metal flow at the exit of a skimmer. The results are summarized in FIG. 7. The unit consumption of the carbonaceous material is represented by the formula of "carbonaceous material/recovered Zn amount".

Figure 7:
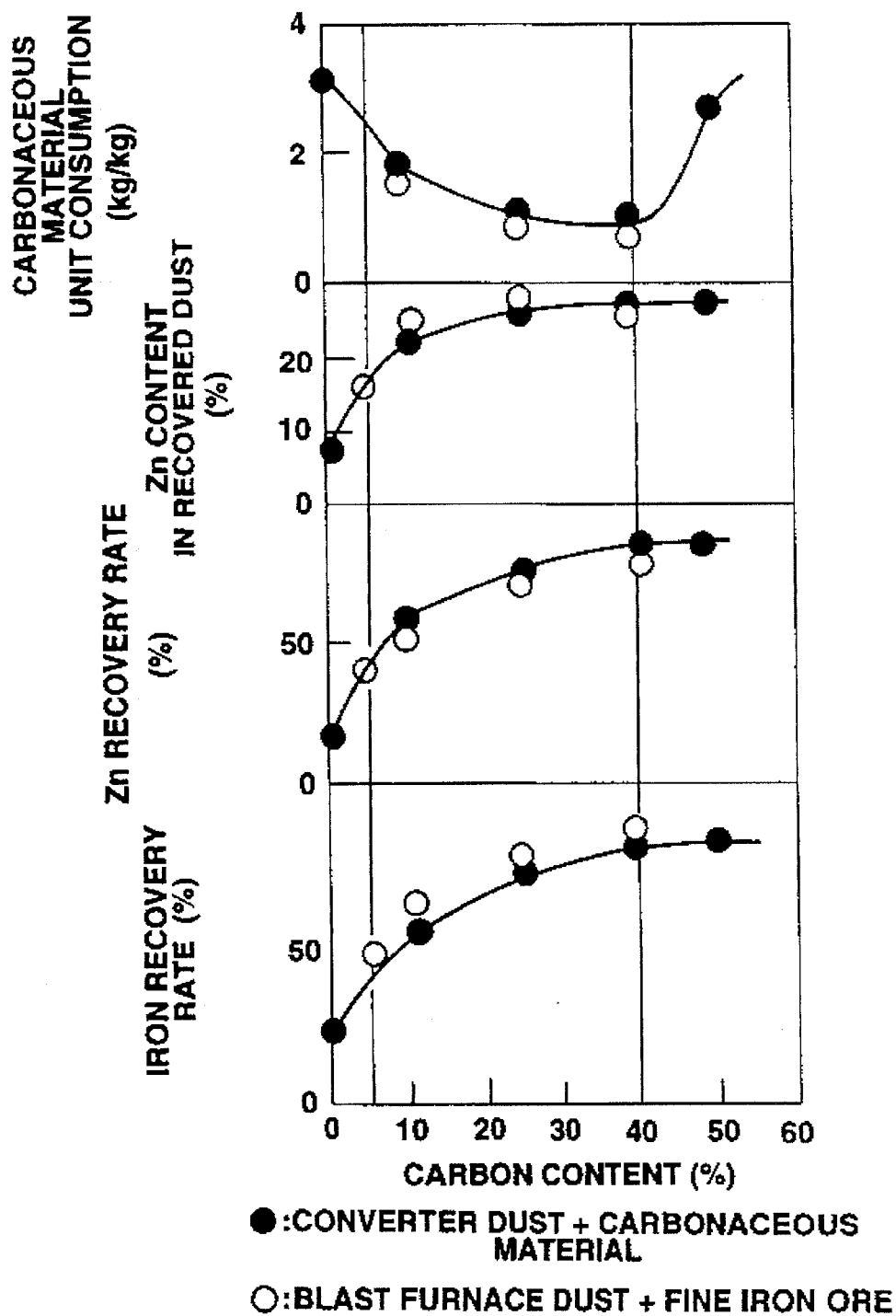
FIG. 7 are graphs which show the relation among carbon content, zinc content in recovered dust, zinc recovery rate, iron recovery rate, and unit consumption of carbonaceous material according to the present invention.

In FIG. 7, the symbol of a closed circle indicates the case that fine coke was mixed into a converter dust, and the symbol of an open circle indicates the case that fine ore was mixed into a blast furnace dust. According to FIG. 7, when the carbon content becomes to 10% or more, the zinc content in collected dust, zinc recovery rate, and iron recovery rate rapidly increase. However, the carbon content of 40% or more is not preferable because the unit consumption of carbon rapidly increases.

tion time was also shortened to about two thirds (from about 30 min. to 20 min.) However, even when fine coke was coated to 40% of carbon equivalent, the rate of shortening the reaction time became very small.

Figure 9:
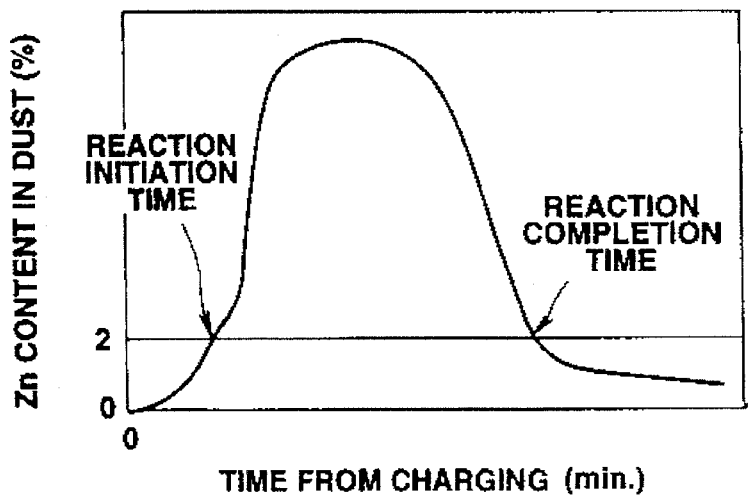
FIG. 9 in a graph which shows the definition of reaction initiation time and reaction completion time.

As shown in FIG. 9, the term "reaction initiation time" is defined as "the time required for the zinc content in the recovered dust increases to 2%". The term "reaction completion time" is defined as "the time required for the zinc content in the recovered dust to become less than 2% after the reaction initiation".

EXAMPLE-5

As shown in Table 5, fine coke was mixed into a converter dust, and further a binder such as Portland cement, quick lime, or bentonite was added to the basic oxygen furnace dust to agglomerate it while varying the added amount of binder for test. In that case, the prepared agglomerates were charged onto the hot metal which was received from a blast furnace into a hot metal ladle. The results are summarized in FIG. 10.

TABLE 3

| Test Level | Mixing Ratio of Raw Material | | | | Agglomerate Shape | Charging Point into Hot Metal |
|---|---|---|---|---|---|---|
| | Blast Furnace Dust | Converter Dust | Additive for Adjusting Carbon | Cement | | |
| F | — | 100 | Fine Coke | 10 | Pellet | Skimmer Exit |
| G | 100 | — | Fine Iron Ore | 10 | Pellet | Skimmer Exit |

Figure 10:
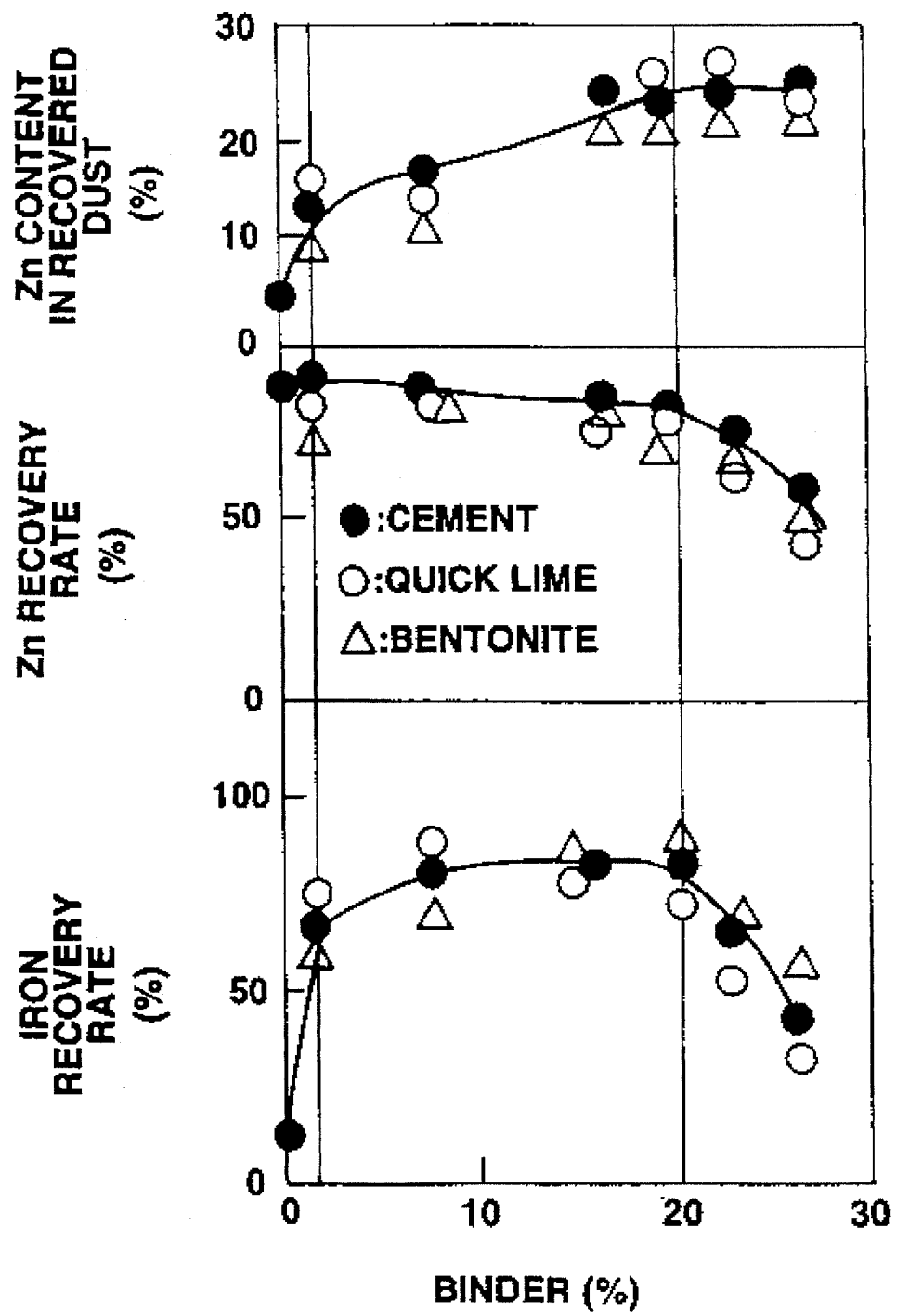
FIG. 10 are graphs which shows the relation of added binder, zinc content in recovered dust, zinc recovery rate, and iron recovery rate according to the present invention.

In FIG. 10, the symbol of a closed circle indicates the case that cement was used as the binder, the symbol of an open circle indicates the case that quick lime was used as the binder, and the symbol of an open triangle indicates the case that bentonite was used as the binder. As seen in the figure, any type of binder tested showed a drastic increase in zinc content of collected dust, zinc recovery rate, and iron recovery rate if only the addition is 1% or more. However, it is not favorable that the binder addition is more than 20% because the zinc and iron recovery rate decreases.

TABLE 4

| Test Level | Blending Ratio of Raw Material | | | | Agglomerate Shape | Charging Point into Hot Metal |
|---|---|---|---|---|---|---|
| | Blast Furnace Dust | Additive for Adjusting Carbon | Carbonaceous Material for Coating | Cement | | |
| H | 100 | Fine Coke | Fine Coke | 10 | Pellet | Skimmer Exit |

TABLE 5

| Test Level | Blending Ratio of Raw Material | | | | Agglomerate Shape | Charging Point into Hot Metal |
|---|---|---|---|---|---|---|
| | Converter Dust | Fine Coke | Pulverized Coal | Binder | | |
| C | 100 | 15 | — | Cement | Pellet | Hot Metal Ladle |
| D | 100 | 15 | — | Quick Lime | Pellet | Hot Metal Ladle |
| E | 100 | — | 15 | Bentonite | Pellet | Hot Metal Ladle |

EXAMPLE-6

With the composition given in Table 6, an agglomerate containing a heat transfer accelerator was prepared. A converter dust was used as the heat transfer accelerator, and the content of the heat transfer accelerator was varied to prepare agglomerates having different metallic iron content. These agglomerates were charged onto the hot metal which was discharged from a blast furnace and was poured into a hot metal ladle. The results are summarized in FIG. 11.

Figure 11:
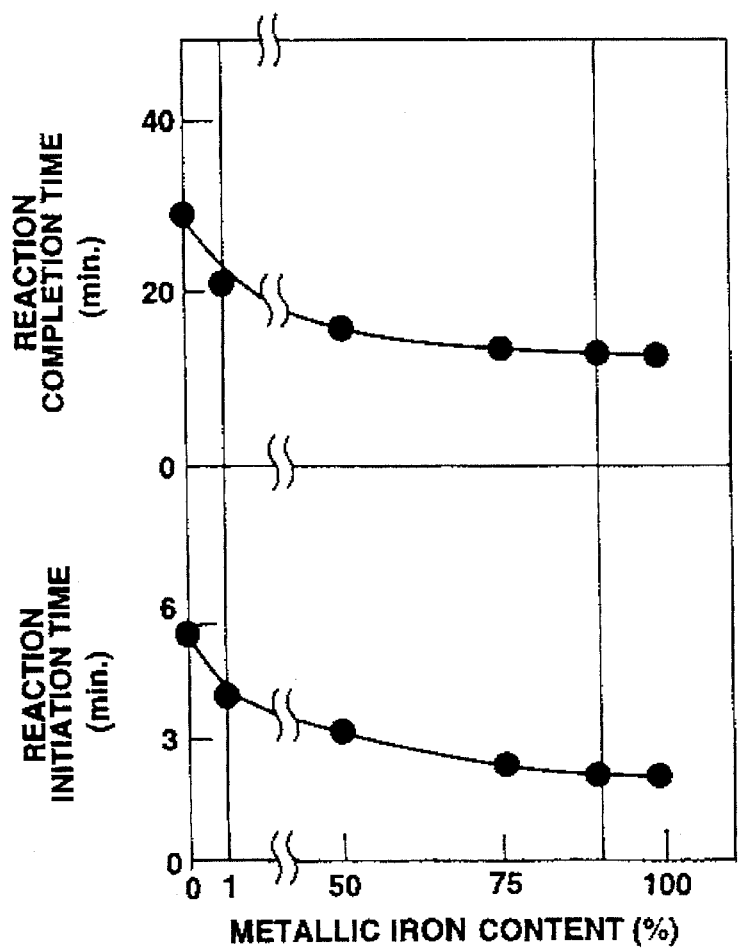
FIG. 11 are graphs which show the relation among metallic iron content, reaction initiation time, and reaction completion time according to the present invention.

FIG. 11 shows the relation between the content of metallic iron, the reaction initiation time, and the reaction completion time. As seen in the figure, the metallic iron as small as 1% shortened the reaction initiation time to about two thirds that of non-addition of converter coarse dust agglomerate, (from about 6 min. to 4 min.), and the reaction completion time was also shortened to about two thirds (from about 30 min. to 20 min.) However, when the content of metallic iron exceeds 90%, the rate of shortening the reaction time became very small.

EXAMPLE-7

Figure 12:
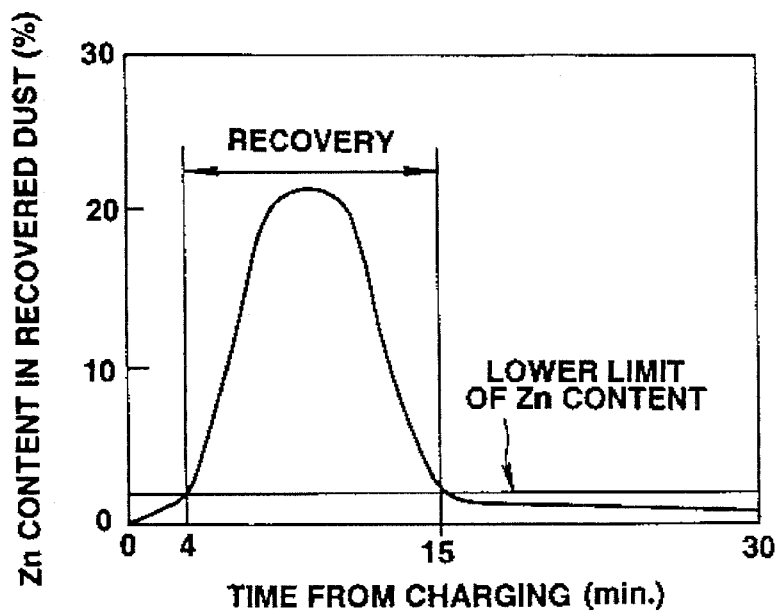
FIG. 12 is a graph which shows a change of zinc content in the recovered dust with time after charging agglomerate according to the present invention.

An agglomerate was prepared by mixing 100 parts of blast furnace dust, 15 parts of fine coke, and 10 parts of cement. The prepared agglomerate was charged onto the hot metal which was received in a hot metal ladle. The continuous analysis of zinc content in the generated dust with the flue gas gave the change of zinc content with time as shown in FIG. 12. Responding to the trend, the zinc content in the generated dust was classified to a specific range to recover.

In concrete terms, the generated dust was recovered immediately after the agglomerate was charged, and the dust collection began at each point of zinc content of 1%, 2%, 3%, 6%, and 10% for zinc recovery and completed the collection when the zinc content reduced to the level of initiation of the collection. The results are summarized in FIG. 13.

Figure 13:
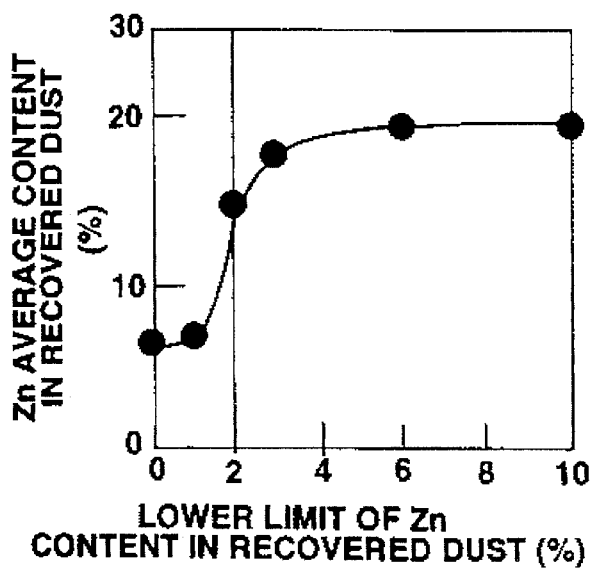
FIG. 13 is a graph which shows the relation among zinc content during dust recovery and average zinc content of recovered dust.

FIG. 13 shows the relation between the zinc content at the initiation of dust collection and the average zinc content in the recovered dust. As shown in the figure, when the zinc content in the generated dust becomes 2% is taken as the initiation of recovery, the average zinc content in the obtained recovered dust rapidly increases and the efficient zinc recovery is performed.

EXAMPLE-8

An agglomerate was prepared by mixing 100 parts of blast furnace dust, 15 parts of powdered coke, and 10 parts

TABLE 6

Figure 14:
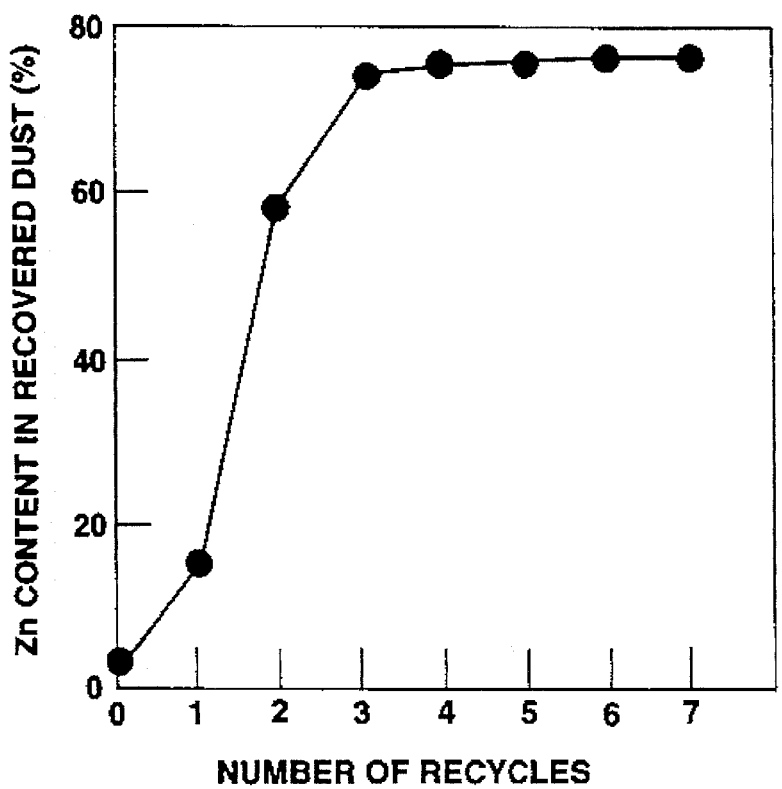
FIG. 14 is a graph which shows the relation between the number of recycles of recovered dust and the zinc content in recovered dust according to the present invention.

| Test Level | Blending Ratio of Raw Material | | | | Agglomerate Shape | Charging Point into Hot Metal |
|---|---|---|---|---|---|---|
| | Blast Furnac Dust | Fine Coke | Cement | Heat Transfer Accelerator | | |
| I | 100 | 15 | 10 | Converter Coarse Dust | Briquette | Hot Metal Ladle | of cement. The prepared agglomerate was charged onto the hot metal at the exit of skimmer. The zinc content in the recovered dust was 17%. The recovered dust was used instead of the above-described blast furnace dust to agglomerate. The obtained agglomerate was again charged onto the hot metal flow. The zinc content in the recovered dust on second recycle was 59%. In this manner, the recovered dust was successively recycled to concentrate zinc. The results are summarized in FIG. 14.

As shown in the figure, two times of recycle of the recovered dust gave about 60% of the zinc content of the recovered dust. When the recovered dust was recycled for two times, the zinc content becomes 50% or more, which level is applicable as the zinc source. Therefore, a simple recirculation of vaporized generated dust yields a zinc source.

According to the invention, a dust containing zinc which is a recovered material containing zinc is charged into hot metal, and the zinc oxide in the dust containing zinc is reduced and then vaporized. The vaporized zinc is collected to recover. In that case, the charged zinc containing dust is agglomerated in advance, so the carry-over of the charged zinc containing dust occurs very little. As a result, a high zinc-content dust is recovered, and the recovery of zinc and iron is performed at a high recovery rate.

Since carbon is included in the agglomerate, the carbon burns in the vicinity and inside of the grains of agglomerate. Consequently, the atmosphere around and inside or the grains becomes a reduced one, and it is heated to significantly accelerate the reducing reaction.

When the carbon source is added to an agglomerate in a state of coating on the grains of agglomerate, the heat of hot metal rapidly burns the carbon source on the surface of grains. As a result, the temperature increase of agglomerate is accelerated, and the time of reducing reaction is shortened.

When the agglomerate is formed by adding a binder, the strength of the grains of agglomerate increases, and the carry-over caused by breaking or powdering of the grains is suppressed. Consequently, a high zinc content dust is recovered, and the recovery of zinc and iron is performed at a high recovery rate.

Furthermore, when the agglomerate contains metallic iron, the heat conductivity of the grains of agglomerate increases, and the rate of heating to the inside of the grains increases. As a result, the time of reducing reaction is shortened.

During the collection and recovery of vaporized zinc, the generated zinc containing dust is sucked along with flue gas, and the zinc content of the generated dust is continuously determined. The inflection point where the observed zinc content shows a sudden increase and decrease is identified, and the generated dust at or above the inflection point is collected. Then, only the dust containing a large amount of zinc is efficiently collected, and the high zinc content dust is recovered.

What is claimed is:

1. A method for recovering zinc from a dust containing zinc and other elements, comprising:

(a) agglomerating dust which contains zinc and other elements, the zinc being in a form of zinc oxides, to form intermediate agglomerates;

(b) coating the intermediate agglomerates with a fine material containing carbon to form a coating layer on the intermediate agglomerates to produce final agglomerates, the final agglomerates containing carbon in an amount of 5 to 40 wt.%;

(c) charging the final agglomerates from step (b) into a hot metal, the zinc oxides in the final agglomerates being reduced and vaporized into a vaporized zinc; and (d) collecting the vaporized zinc as zinc oxide in a zinc concentrated dust.

2. The method of claim 1, wherein said dust which is agglomerated in said step (a) further contains carbon.

3. The method of claim 2, wherein said dust is a fine dust from a blast furnace.

4. The method of claim 1 further comprising curing the intermediate agglomerates from step (a) in a steam atmosphere.

5. The method of claim 1, wherein the carbon content of the final agglomerates is 10 to 30wt.%.

6. The method of claim 1, wherein the final agglomerates are produced by the following steps:

agglomerating in step (a) the zinc containing dust to form the intermediate agglomerates;

curing the intermediate agglomerates in a steam atmosphere;

coating the cured intermediate agglomerates with carbonaceous material to form the final agglomerates; and drying the coated final agglomerates.

7. The method of claim 1 wherein the dust which is agglomerated in said step (a) is a fine dust from a converter.

8. The method of claim 1, wherein said hot metal is tapped from a blast furnace and which flows on a runner of a casting yard of a blast furnace.

9. The method of claim 1, wherein said hot metal is introduced into a hot metal ladle.

10. The method of claim 1, wherein said fine material is at least one selected from the group consisting of fine coke, pulverized coal and fine dust from a blast furnace.

11. The method of claim 1, wherein said hot metal is at a temperature of 1500° C.

12. The method of claim 1, wherein the coating layer has a carbon content of 0.2 to 40 wt.% based on the weight of the agglomerates and the agglomerates have a carbon content of 5 to 40 wt.% based on the weight of the agglomerates.

13. The method of claim 1, wherein said fine material contains metallic iron.

14. The method of claim 13, wherein the final agglomerates contain 1 to 90 wt.% metallic iron.

15. The method of claim 14, wherein the final agglomerates contain 50 to 75 wt.% metallic iron.

16. The method of claim 1, wherein said step step (a) further comprises adding a binder in an amount of 1 to 20 wt.% to the dust which is agglomerated in said step (a).

17. The method of claim 16, wherein the binder is added in an amount of 5 to 15 wt.%.

18. The method of claim 16, wherein the binder is at least one selected from the group consisting of cement, quick lime and bentonite.

19. The method of claim 1, wherein the final agglomerates have the following size distribution:

1 mm or less:10 wt.% or less, 40 mm or more:20 wt.% or less, and over 1 mm and under 40 mm: the rest.

20. The method of claim 1, wherein said step (d) comprises the steps of:

drawing the zinc concentrated dust in an exhaust gas by suction;

continuously analyzing a zinc concentration of the zinc concentrated dust in the exhaust gas; and separating by dampers the exhaust gas into two streams of gas according to the zinc concentration.

21. The method of claim 1, wherein said intermediate agglomerates are pellets which are produced by a pan pelletizer.

22. The method of claim 1, wherein said intermediate agglomerates are briquettes which are produced by a briquetting machine.

* * * * *